(12) United States Patent
Foti et al.

(10) Patent No.: US 6,654,606 B1
(45) Date of Patent: Nov. 25, 2003

(54) CALL STATE CONTROL FUNCTION (CSCF) CALL PROCESSING

(75) Inventors: George Foti, Dollard des Ormeaux (CA); Sorin Surdila, St. Dorothee Laval (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 401 days.

(21) Appl. No.: 09/676,003

(22) Filed: Sep. 29, 2000

(51) Int. Cl.[7] .................................. H04Q 7/20
(52) U.S. Cl. ................. 455/432; 455/445; 370/392; 370/401
(58) Field of Search ............... 455/432, 445, 455/433, 422, 560; 370/392, 401, 400, 410, 335, 342

(56) References Cited

U.S. PATENT DOCUMENTS

2001/0031635 A1 * 10/2001 Bharatia ............... 455/432

FOREIGN PATENT DOCUMENTS

| WO | WO 98/11752 | 3/1998 |
| WO | WO 99/53711 | 10/1999 |

* cited by examiner

*Primary Examiner*—Lee Nguyen
(74) *Attorney, Agent, or Firm*—Smith, Danamraj & Youst; Sandra Beauchesne, Patent Agent

(57) ABSTRACT

A Call State Control Function (CSCF) and method of processing a call to a called mobile station (MS). The method is performed in all of the CSCFs in a third generation Internet Protocol (3G.IP) network. When an incoming call setup message such as a Fast Setup or Location Request message is received in the CSCF, the CSCF first determines with a relationship function, whether the CSCF is the Home CSCF for the called MS. If so, a first set of call processing steps are performed. If the CSCF is not the Home CSCF, the CSCF determines if it is currently serving the called MS. If the CSCF is the Serving CSCF, a second set of call processing steps are performed. If the CSCF is neither the Home CSCF nor the Serving CSCF for the called MS, a third set of call processing steps are performed.

10 Claims, 3 Drawing Sheets

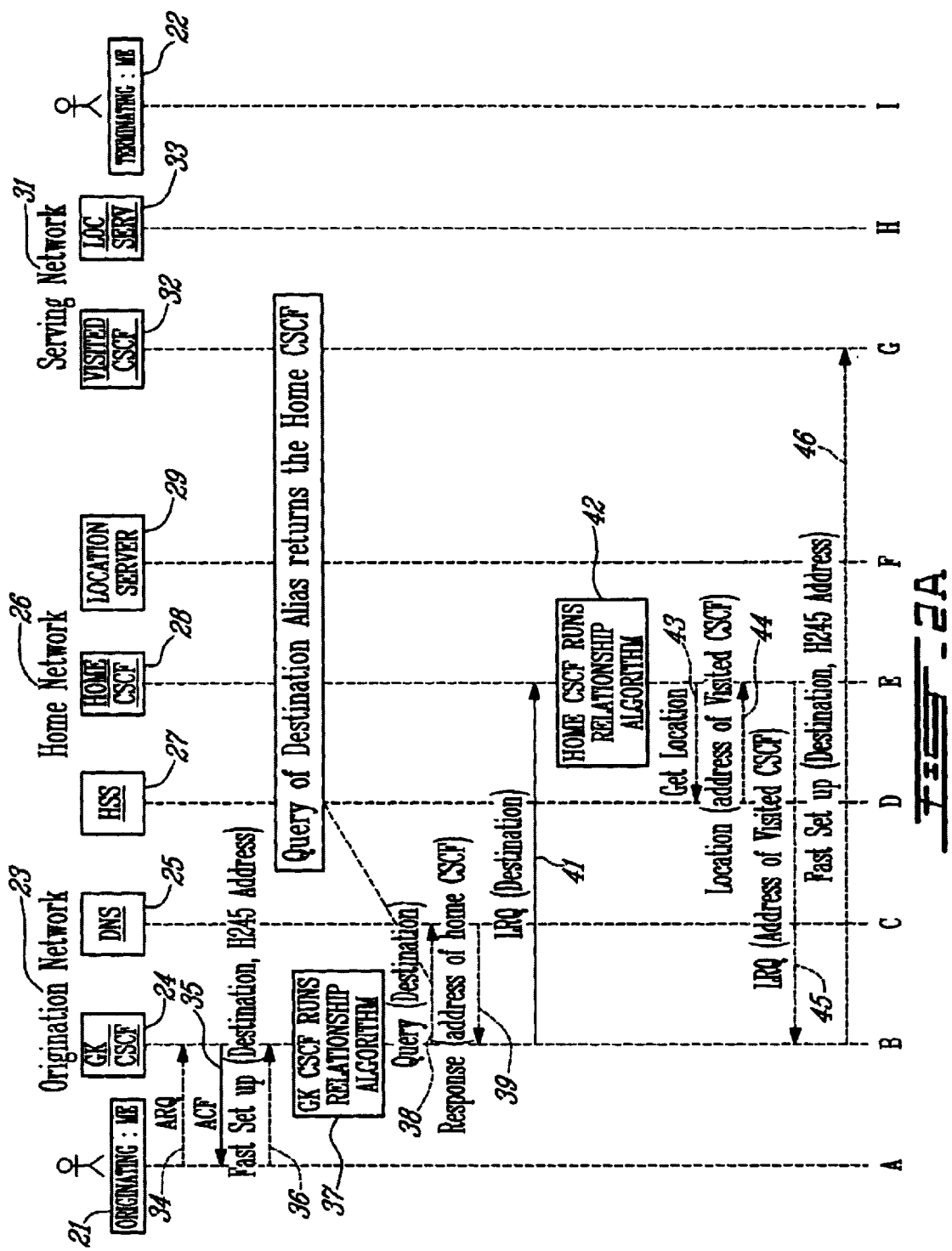

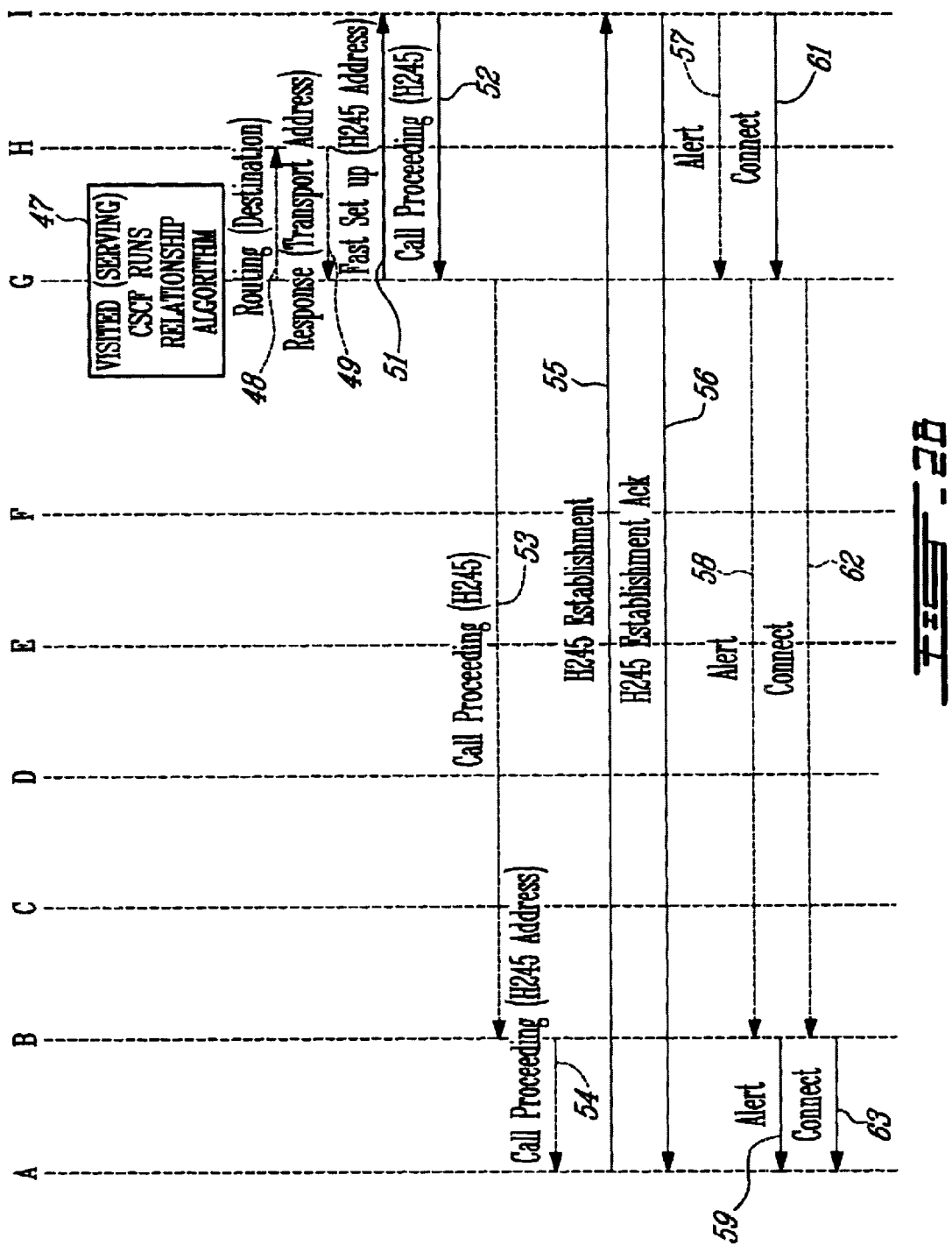

CALL STATE CONTROL FUNCTION (CSCF) CALL PROCESSING

BACKGROUND OF THE INVENTION

1. Technical Field of the Invention

This invention relates to telecommunication systems and, more particularly, to a method of call processing in a Call State Control Function (CSCF) in a third generation Internet Protocol (3G.IP) network.

2. Description of Related Art

In second generation (2G) radio telecommunications networks, each type of call setup message is associated with a specific function and has specific properties that trigger predetermined responses from any Mobile Switching Center (MSC) that receives one of the messages. For example, an originating Mobile Switching Center (MSC) that receives an originating call request from a Mobile Station (MS) automatically performs a number analysis on the called number. If the called number is a mobile number, the originating MSC interrogates the Home Location Register (HLR) associated with the called number to determine the mobile subscriber's current location. When the location is determined, the HLR sends a Routing Request (ROUTREQ) message to the Visited MSC where the called subscriber is located. The ROUTREQ is a different type of call setup message, and when the ROUTREQ message is received in the Visited MSC, it indicates to the Visited MSC that a call is being placed to a particular MS that is located in the Visited MSC's service area. The Visited MSC's response to the ROUTREQ message is to page for the called MS because it is already known that the called subscriber is located there. Thus, none of the MSCs are required to determine their relationship to the called subscriber because each of the call setup messages is specific to a known set of circumstances, and each message has a predetermined response and actions to be performed.

In the 3G.IP networks currently being designed, MSC functions are performed by Call State Control Functions (CSCFs). In addition, call setup messages such as the Fast Setup message and the Location Request (LRQ) message for H.323, and the INVITE message for the Session Initiation Protocol (SIP), do not have properties that indicate to a CSCF receiving them what call processing functions should be performed. Therefore, call processing cannot continue until the CSCF determines what call processing functions it should perform. The present invention provides a CSCF and method by which any CSCF receiving a call setup message can determine what call processing functions it should perform.

SUMMARY OF THE INVENTION

In one aspect, the present invention is a method of processing a call to a called mobile station (MS). The method is performed in a Call State Control Function (CSCF) in a third generation Internet Protocol (3G.IP) network. The method begins when an incoming call setup message is received in the CSCF. The call setup message includes an identifier of the called MS, so the CSCF can determine with a relationship function, whether the CSCF is a Home CSCF for the called MS, a Serving CSCF for the called MS, or neither a Home CSCF nor a Serving CSCF for the called MS. The CSCF then selectively performs different call processing steps depending on the result determined by the relationship function.

In another aspect, the present invention is a CSCF in a 3G.IP network for processing a call to a called MS. The CSCF includes means for receiving an incoming call setup message that includes an identifier of the called MS; a relationship function that determines whether the CSCF is the Home CSCF for the called MS, a Serving CSCF for the called MS, or neither a Home CSCF nor a Serving CSCF for the called MS; and means for selectively performing different call processing steps depending on a result determined by the relationship function.

In yet another aspect, the present invention is an all-IP network in which call processing of a call to a called MS is performed by a plurality of CSCFs. The network includes a Home Subscriber Server (HSS) that stores location information for the called MS, a location server that stores a transport address for the called MS, and a Domain Name Server (DNS) that stores an address for a Home CSCF for the called MS. A relationship function is implemented in each of the plurality of CSCFs, and determines whether any CSCF that receives a call setup message is the Home CSCF for the called MS, a Serving CSCF for the called MS, or neither a Home CSCF nor a Serving CSCF for the called MS. Each CSCF also includes defined call processing functions that are selectively performed, depending on a result determined by the relationship function.

BRIEF DESCRIPTION OF THE DRAWINGS

The invention will be better understood and its numerous objects and advantages will become more apparent to those skilled in the art by reference to the following drawings, in conjunction with the accompanying specification, in which:

FIG. 2A and FIG. 2B, together referred to as FIG. 2, hereinafter are a signalling diagram illustrating the flow of messages between nodes in a 3G.IP network when call processing is performed in accordance with the teachings of the present invention.

DETAILED DESCRIPTION OF EMBODIMENTS

Figure 1:
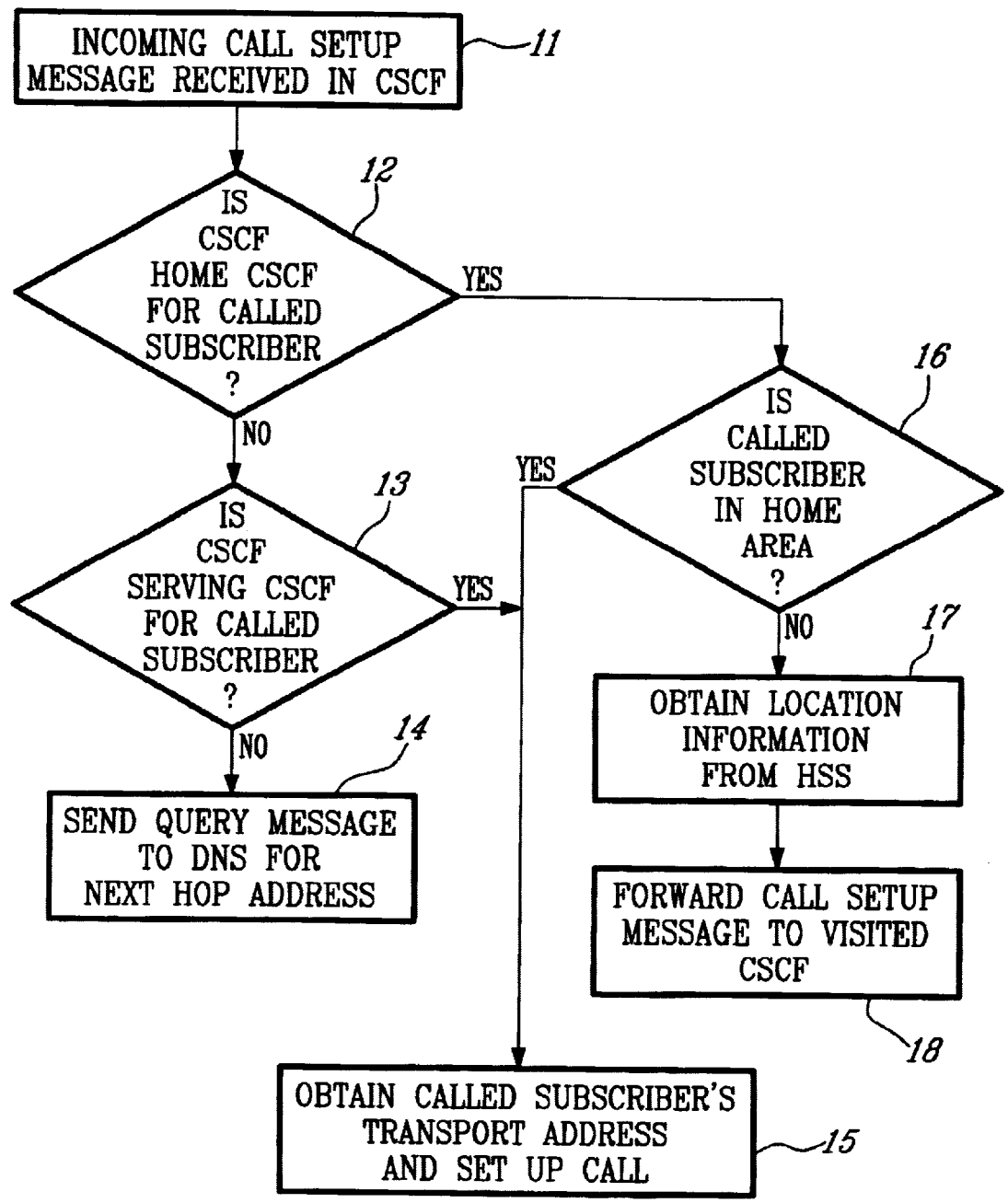
FIG. 1 is a flow chart illustrating the steps of the preferred embodiment of a relationship function utilized in each CSCF in the 3G.IP network.

When an MS originates a call in a 3G.IP network, and the incoming call setup message is received by a CSCF, the relationship of the CSCF to the called subscriber may fall into one of three categories: the CSCF may be the Home CSCF for the called subscriber; the CSCF may not be the Home CSCF, but may currently be serving the called subscriber; or the CSCF may be neither the Home CSCF nor the Serving CSCF. In each case, the CSCF must perform different call processing functions. Therefore, the CSCF must determine its relationship to the called subscriber before call processing can proceed. In the present invention, a relationship function is implemented in each CSCF for this purpose.

When an incoming call setup message such as a Fast Setup or Location Request message for H.323, and an INVITE message for SIP, is received in any CSCF in the network, the CSCF first determines with the relationship function, whether the CSCF is the Home CSCF for the called MS. If so, a first set of call processing steps are performed. If not, the CSCF determines if it is currently serving the called MS. If the CSCF is the Serving CSCF, a second set of call processing steps are performed. If the CSCF is neither the Home CSCF nor the Serving CSCF for the called MS, a third set of call processing steps are performed.

The preferred embodiment discussed herein is described in terms of H.323 signaling. However, as would be recognized by those skilled in the art, the functionality of the invention is equally applicable to other specific signaling protocols such as SIP.

FIG. 1 is a flow chart illustrating the steps of the preferred embodiment of the relationship function utilized in each CSCF in a 3G.IP network. At step 11, an incoming call setup message is received in a CSCF in the 3G.IP network. The call setup message may be, for example, a Fast Setup message or an LRQ message for H.323, or an INVITE message for SIP. The call setup message includes the destination alias and H.245 address of the called subscriber. At step 12, the CSCF determines whether or not it is the Home CSCF of the called subscriber. If not, the process moves to step 13 where the CSCF determines from its internal database whether or not it is currently serving the called subscriber. If not, the process moves to step 14 where a query is sent to a Domain Name Server (DNS) to find the next hop address for the setup message. If the CSCF is currently serving the called subscriber, the process moves to step 15 where the CSCF obtains the called subscriber's transport address and proceeds to set up the call.

Returning to step 12, if the CSCF determines that it is the Home CSCF of the called subscriber, the process moves to step 16 where the CSCF checks its internal database to determine whether or not the called subscriber is located in the home area. If so, the process moves to step where the CSCF obtains the called subscriber's transport address and proceeds to set up the call. If the called subscriber is not located in the home area, the process moves instead to step 17 where the CSCF obtains location information from the subscriber's Home Subscriber Server (HSS). The HSS returns the address of a Visited CSCF, and the CSCF forwards the call setup message to the Visited CSCF at step 18.

FIG. 2 is a signaling diagram illustrating the flow of messages between nodes in a 3G.IP network when call processing is performed in accordance with the teachings of the present invention. An originating mobile subscriber is shown using Originating Mobile Equipment (ME) 21 which may include a Mobile Station (MS) and user equipment connected to the MS. A call is being placed to a terminating mobile subscriber who is using Terminating ME 22. An Originating Network 23 includes a CSCF 24 that incorporates gatekeeper (GK) functionality and a Domain Name Server (DNS) 25. A Home Network 26 includes a Home Subscriber Server (HSS) 27, a Home CSCF 28, and a Location Server 29. A Serving Network 31 includes a Visited CSCF 32, and a Location Server 33.

The Originating ME 21 initiates a call by sending an Admission Request (ARQ) message 34 to the GK CSCF 24 which returns an Admission Confirm (ACF) message 35 to the originating subscriber. The Originating ME then sends a Fast Setup message 36 to the GK CSCF. The Fast Setup message includes an identifier (Destination Alias) and a destination media address (H.245 Address) for the Terminating ME 22. Upon receipt of the Fast Setup message at step 37, the GK CSCF performs the relationship function, as shown in FIG. 1, to determine its relationship to the called mobile subscriber and the required call processing steps.

In the current situation, the GK CSCF 24 is neither the Home CSCF nor the Serving CSCF for the called mobile subscriber. Therefore, referring briefly to FIG. 1, it can be seen that the process proceeds from step 11 where the Fast Setup message is received, to steps 12, 13, and 14 where it is determined that a query message should be sent to the DNS 25 to obtain a next hop address for the Fast Setup message. Therefore, referring once again to FIG. 2, the GK CSCF sends a Query message 38 for the Destination Alias to the DNS 25 in the Originating Network. This Query results in a Response to the GK CSCF at 39 which indicates the IP address of the Home CSCF 28.

The GK CSCF 24 then sends a Location Request (LRQ) message 41 to the Home CSCF 28. Upon receipt of the LRQ message at step 42, the Home CSCF performs the relationship function, as shown in FIG. 1, to determine its relationship to the called mobile subscriber and the required call processing steps. In the current situation, the CSCF receiving the LRQ message is the Home CSCF 28 for the called mobile subscriber. Therefore, referring briefly to FIG. 1, it can be seen that the process proceeds from step 11 where the LRQ message is received, to step 12 and step 16 where the Home CSCF checks its internal database and determines that the called mobile subscriber is not currently located in the home area. Therefore, the process moves to steps 17 and 18 where it is indicated that the Home CSCF must obtain location information from the HSS and forward the LRQ message to a Visited CSCF.

Therefore, referring once again to FIG. 2, the Home CSCF 28 sends a Query 43 to the HSS 27 to obtain location information for the called (terminating) mobile subscriber. In response, at step 44, the HSS returns the IP address of the Visited CSCF 32 where the called mobile subscriber is currently located. At step 45, the Home CSCF answers the LRQ message from the GK CSCF 24 by sending the IP address of the Visited CSCF to the GK CSCF, and at 46, the GK CSCF sends a Fast Setup message to the Visited CSCF. The Fast Setup message includes the Destination Alias and the H.245 Address for the Terminating ME 22. Upon receipt of the Fast Setup message at step 47, the Visited CSCF performs the relationship function, as shown in FIG. 1, to determine its relationship to the called mobile subscriber and the required call processing steps.

In the current situation, the Visited CSCF 32 is not the called mobile subscriber's Home CSCF, but is the Serving CSCF for the called subscriber. Therefore, referring briefly to FIG. 1, it can be seen that the process proceeds from step 11 where the Fast Setup message is received, to steps 12, 13, and 15 where it is determined that the Visited CSCF should obtain the called subscriber's transport address and set up the call. Therefore, referring once again to FIG. 2, the Visited CSCF sends a Routing message 48 for the Destination Alias to the Location Server 23 in the Serving Network 31. This results in a Response to the Visited CSCF at 49 which indicates the transport address of the Terminating ME 22.

At step 51, the Visited CSCF 32 sends a Fast Setup message to the Terminating ME which returns a Call Proceeding message to the Visited CSCF at 52. At step 53, the Visited CSCF sends the Call Proceeding message to the GK CSCF 24 in the Originating Network 23. The GK CSCF then sends the Call Proceeding message to the Originating ME 21 at step 54. At this point, an H.245 Establishment message 55 is sent from the Originating ME to the Terminating ME, and the Terminating ME returns an H.245 Establishment Acknowledgment message 56 to the Originating ME. This opens up the media channel between both terminals. The Terminating ME then sends an Alert message to the Visited CSCF at 57. At 58, the Visited CSCF forwards the Alert message to the GK CSCF 24 which, in turn, sends the Alert message to the Originating ME at 59. The Terminating ME then sends a Connection message to the Visited CSCF at 61. At 62, the Visited CSCF forwards the Connection message to the GK CSCF which, in turn, sends the Connection message to the Originating ME at 63. The call setup is then complete.

It is thus believed that the operation and construction of the present invention will be apparent from the foregoing description. While the CSCF and method shown and described has been characterized as being preferred, it will be readily apparent that various changes and modifications could be made therein without departing from the scope of the invention as defined in the following claims.

What is claimed is:

1. In a Call State Control Function (CSCF) in a third generation Internet Protocol (3G.IP) network, a method of processing a call to a called mobile station (MS), said method comprising the steps of:
   receiving an incoming call setup message in the CSCF, said call setup message including an identifier of the called MS;
   determining with a relationship function, whether the CSCF is a Home CSCF for the called MS, a Serving CSCF for the called MS, or neither the Home CSCF nor the Serving CSCF for the called MS;
   upon determining that the CSCF is the Home CSCF, determining whether the called MS is located in the Home CSCF's service area;
   upon determining that the called MS is not located in the Home CSCF's service area:
      obtaining location information for the called MS from a Home Subscriber Server (HSS); and
      forwarding the call setup message to a Visited CSCF that is identified in the location information obtained from the HSS; and
   selectively performing different call processing steps depending on a result determined by the relationship function.

2. The method of processing a call of claim 1 wherein the step of performing different call processing steps depending on a result determined by the relationship function includes the steps of:
   upon determining that the called MS is located in the Home CSCF's service area:
      obtaining a transport address for the called MS from a location server; and
      setting up the call.

3. The method of processing a call of claim 1 wherein the step of performing different call processing steps depending on a result determined by the relationship function includes the steps of:
   upon determining that the CSCF is not the Home CSCF:
      determining whether the CSCF is currently serving the called MS; and
      obtaining a transport address for the called MS from a location server and setting up the call, upon determining that the CSCF is currently serving the called MS.

4. The method of processing a call of claim 1 wherein the step of performing different call processing steps depending on a result determined by the relationship function includes the steps of:
   upon determining that the CSCF is not the Home CSCF:
      sending a query message to a Domain Name Server (DNS) to obtain an address of the called MS's Home CSCF, upon determining that the CSCF is not currently serving the called MS.

5. In a Call State Control Function (CSCF) in a third generation Internet Protocol (3G.IP) network, a method of processing a call to a called mobile station (MS), said network having a plurality of CSCFs, a Home Subscriber Server (HSS) that stores location information for the called MS, a location server that stores a transport address for the called MS, and a Domain Name Server (DNS) that stores an address for a Home CSCF for the called MS, said method comprising the steps of:
   receiving an incoming call setup message in the CSCF, said call setup message including an identifier of the called MS;
   determining in the CSCF whether the CSCF is the Home CSCF for the called MS;
   upon determining that the CSCF is the Home CSCF:
      determining whether the called MS is located in the Home CSCF's service area;
      obtaining location information for the called MS from the HSS, upon determining that the called MS is not located in the Home CSCF's service area; and
      obtaining a transport address for the called MS from the location server and setting up the call, upon determining that the called MS is located in the Home CSCF's service area;
   upon determining that the CSCF is not the Home CSCF:
      determining whether the CSCF is currently serving the called MS;
      obtaining a transport address for the called MS from the location server and setting up the call, upon determining that the CSCF is currently serving the called MS; and
      sending a query message to the DNS to obtain the address of the called MS's Home CSCF, upon determining that the CSCF is not currently serving the called MS.

6. The method of processing a call of claim 5 wherein the method is performed in every CSCF in the network whenever an incoming call setup message is received in the CSCF.

7. In a Call State Control Function (CSCF) in a third generation Internet Protocol (3G.IP) network, a method of processing a call to a called mobile station (MS), said method comprising the steps of:
   receiving an incoming call setup message in the CSCF, said call setup message including an identifier of the called MS;
   determining with a relationship function, whether the CSCF is a Home CSCF for the called MS;
   performing a first set of call processing steps if the CSCF is the Home CSCF for the called MS;
   determining whether the CSCF is currently serving the called MS if the CSCF is not the Home CSCF for the called MS;
   performing a second set of call processing steps if the CSCF is currently serving the called MS; and
   performing a third set of call processing steps if the CSCF is not the Home CSCF and is not currently serving the called MS.

8. An all-Internet Protocol (IP) network in which call processing of a call to a called mobile station (MS) is performed by a plurality of Call State Control Functions (CSCFs), said network comprising:
   a Home Subscriber Server (HSS) that stores location information for the called MS;
   a location server that stores a transport address for the called MS; a Domain Name Server (DNS) that stores an address for a Home CSCF for the called MS;

a relationship function implemented in each of the plurality of CSCFs that determines whether any CSCF that receives a call setup message is the Home CSCF for the called MS, a Serving CSCF for the called MS, or neither a Home CSCF nor a Serving CSCF for the called MS; and defined call processing functions in each CSCF that are selectively performed, depending on a result determined by the relationship function, wherein the defined call processing functions in each CSCF include a function that obtains the address for the Home CSCF for the called MS from the DNS and forwards the call setup message to the Home CSCF, upon determining that the CSCF that received the call setup message is neither the Home CSCF nor the Serving CSCF for the called MS.

9. The all-IP network of claim 8 wherein the defined call processing functions in each CSCF include a function that obtains the location information for the called MS from the HSS, and forwards the call to a Serving CSCF at that location, upon determining that the CSCF that received the call setup message is the Home CSCF, but not the Serving CSCF, for the called MS.

10. The all-IP network of claim 8 wherein the defined call processing functions in each CSCF include a function that obtains the transport address of the called MS from the location server and sets up the call, upon determining that the CSCF that received the call setup message is the Serving CSCF for the called MS.

* * * * *